Figure 1:
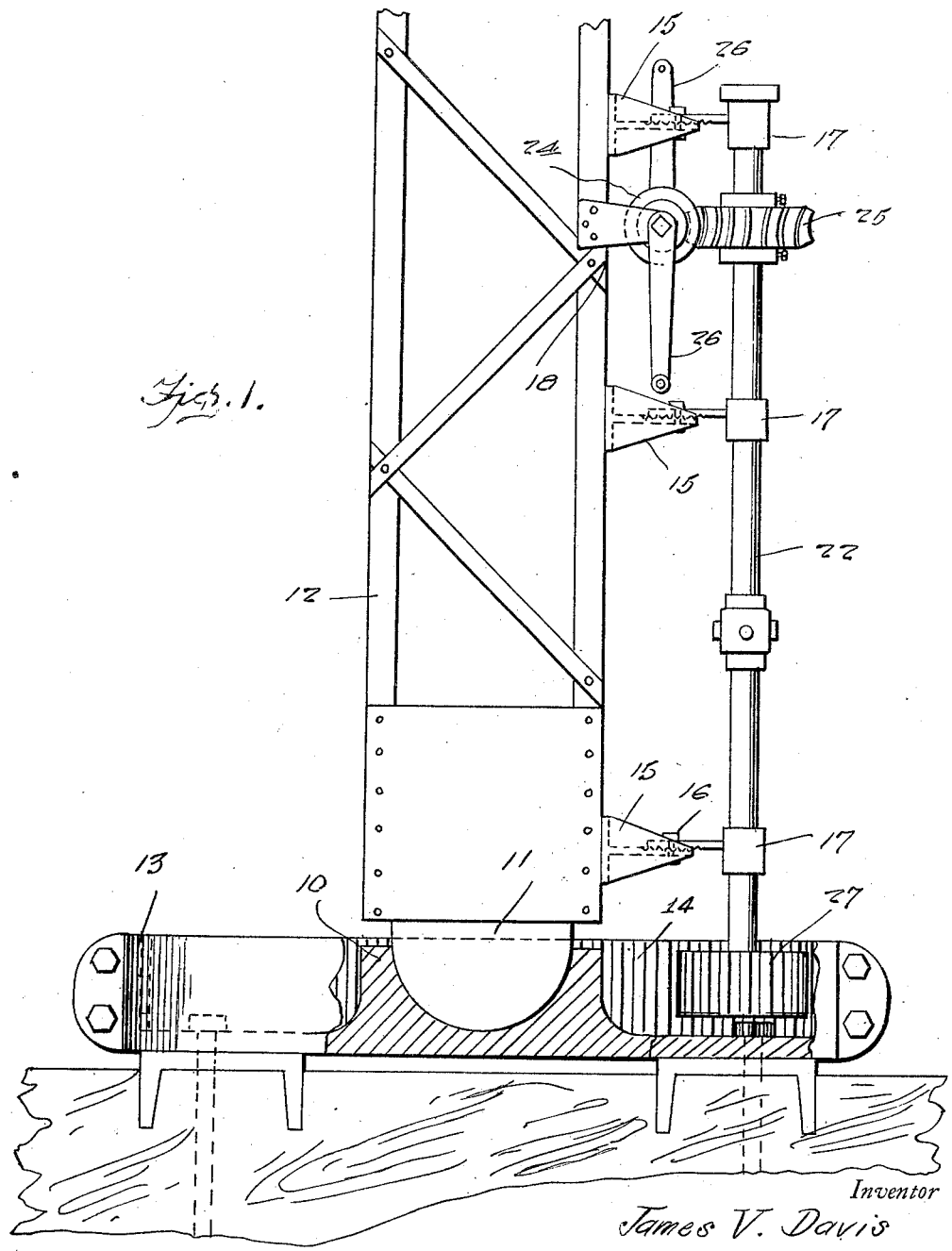

Patented May 21, 1929.

1,713,953

UNITED STATES PATENT OFFICE.

JAMES V. DAVIS, OF SPRINGFIELD, OHIO.

SWINGING GEAR SUPPORT FOR DERRICK MASTS.

Application filed July 28, 1927. Serial No. 209,049.

This invention relates generally to new and useful improvements in guy derricks and the like, and aims to provide a swinging gear support for the vertical mast unit thereof, and aims to provide means whereby the mast may be easily and quickly rotated upon the support so that the lifting structure thereof may be efficiently moved to the proper position.

In carrying out the present invention, there is provided a swinging gear construction, of relatively small compass, and closely related to the mast unit whereby said mast may be rotated, either by hand or any suitable power means.

In the drawings:—

Figure 2:
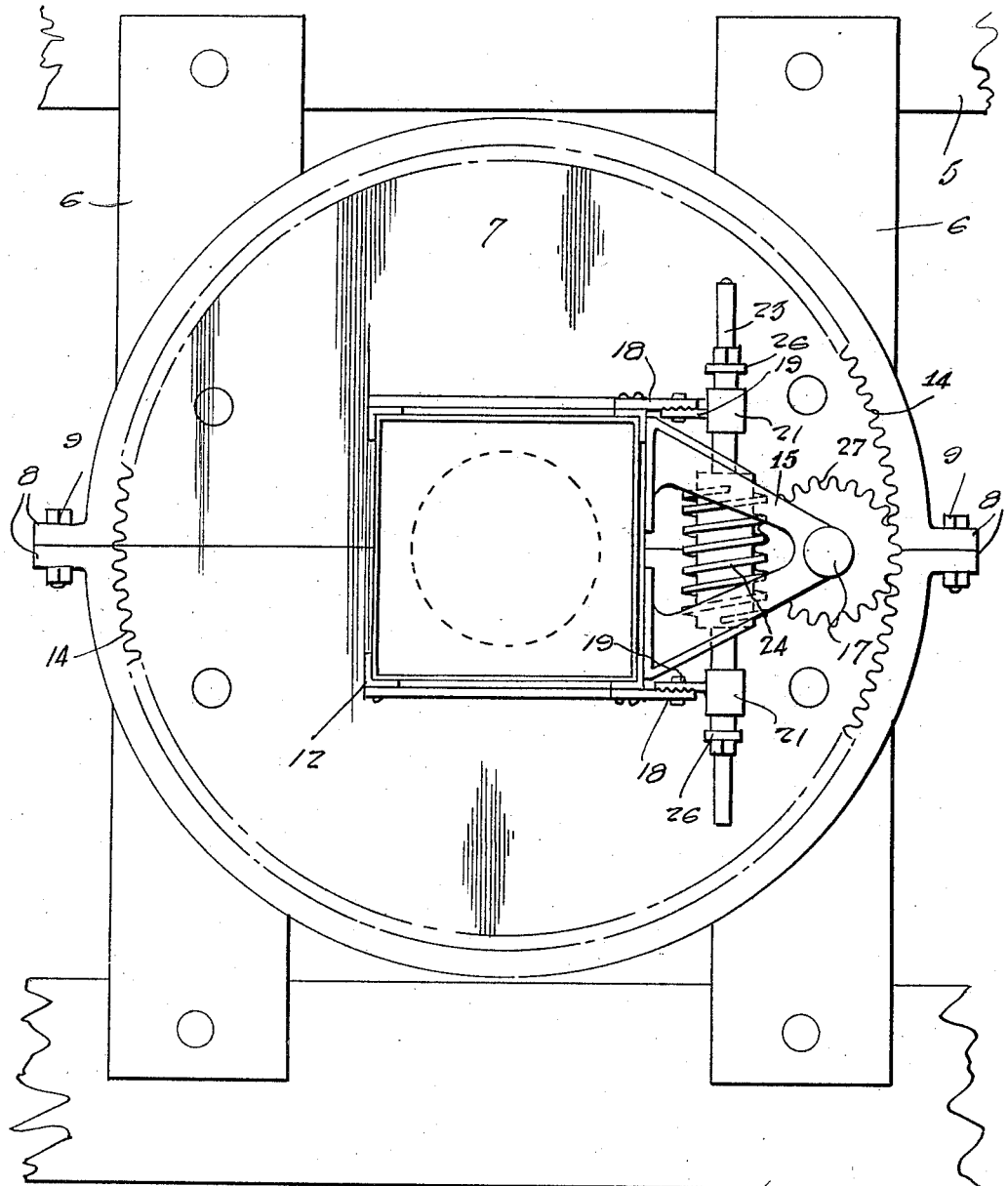

Figure 1 is a view of the lower end of a guy derrick mast supported by reason of my swinging gear structure, that facilitates the turning of the mast and Fig. 2 is a top plan view thereof.

Now having particular reference to the drawings, 5—5 designates a pair of suitably spaced and parallel foot blocks transversely spanning which, is a pair of channel bars 6—6, the side walls of which are sunken within the blocks while the ends of said channel bars are bolted or otherwise rigidly secured thereto.

Anchored to these channel bars 6—6 is a relatively large circular plate 7 of heavy metal and preferably constructed of a pair of half sections formed at their adjacent ends with lateral ears 8—8, so that said half sections may be rigidly interconnected by bolts 9. At the center of the plate 7, there is formed an upstanding circular socket member 10, within which is fitted the lower rounded and solid end 11 of a vertically extending mast unit 12, of a conventional derrick.

The sections of the plate 7 are formed at their circular edges with upstanding flanges to provide a rim 13 around said plate, the inner surface of which is formed with gear teeth 14.

At one side of the mast 12, adjacent the lower end thereof there is provided spaced laterally extending and horizontal V-shaped arms 15 to the apex ends of which are adjustably secured other horizontally extending arms 16, formed or otherwise equipped at their outer ends with vertically extending shaft bearings 17.

As disclosed in Fig. 2, the mast attached arms 15, are preferably of V formation, while secured to the sides of the mast 12, between the uppermost arms 15, are laterally extending horizontal bracket plates 18—18, to the outer ends of which are adjustably secured arms 19—19 but are equipped at their outer ends with alined shaft bearings 21—21.

Arranged within the vertically extending bearings 17 is a shaft 22, while journaled within the complementary bearings 21—21 is a horizontal shaft 23. Intermediate the bearings 21—21 said shaft is equipped with a worm 24 having mesh with a gear 25, upon the vertical shaft 22.

The shaft 23 may be equipped at its ends with hand cranks 26, or there may be operatively attached to this shaft, an electric motor or other suitable power plant, whereby said shaft may be rotated for consequently rotating the shaft 22.

Keyed to the lower end of the vertical shaft 22 is a spur gear 27, that has mesh with the teeth upon the inner surface of the rim 13, of the mast supporting plate 7, with the obvious result that when said shaft 22 is rotated, the mast 12, together with its associated structure will be turned upon its support.

It will thus be seen that I have provided a highly novel, simple and efficient swinging gear support for guy derrick masts, that is well adapted for all of the purposes heretofore designated, and even though I have herein shown and described the invention as consisting of certain detailed structural elements, it is nevertheless to be understood that some changes may be made therein without affecting the spirit and scope of the appended claim.

Having thus described my invention, what I claim as new and desire to secure by Letters Patent is:

In a swinging gear for derricks wherein the mast is swivelly supported upon the base, and wherein the base is provided with a concentrically arranged gear for cooperation with means on the mast, whereby the mast may be swung, a pair of V-shaped brackets vertically spaced and supported in outstanding position on the mast, said brackets being secured at their end portions to the mast, a shaft journaled vertically through the apex portions of said brackets, a gear on the lower end of said shaft for mesh relation with the gear on the base, a gear on the upper portion of the shaft, an outwardly adjustable bracket secured to said mast, a rotatable shaft journaled on said bracket, and gear means between said last mentioned shaft and the vertical shaft whereby the latter may be rotated.

In testimony whereof I affix my signature.

JAMES V. DAVIS.